United States Patent
Cho et al.

(10) Patent No.: US 7,414,808 B2
(45) Date of Patent: Aug. 19, 2008

(54) APPARATUS AND METHOD FOR ADAPTIVELY ADJUSTING RECORDING DENSITY OF A DISK UTILIZING A TRAPEZOIDAL SHAPED MAGNETIC HEAD

(75) Inventors: Yoon-chul Cho, Seoul (KR); Keung-youn Cho, Namyangju-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 103 days.

(21) Appl. No.: 11/606,912

(22) Filed: Dec. 1, 2006

(65) Prior Publication Data

US 2007/0127150 A1 Jun. 7, 2007

(30) Foreign Application Priority Data

Dec. 3, 2005 (KR) .................... 10-2005-0117268

(51) Int. Cl.
G11B 5/09 (2006.01)
G11B 5/187 (2006.01)
(52) U.S. Cl. ........................................ 360/75
(58) Field of Classification Search .............. None
See application file for complete search history.

(56) References Cited

U.S. PATENT DOCUMENTS 6,043,951 A 3/2000 Lee
6,504,675 B1 1/2003 Shukh et al.
6,813,116 B2 * 11/2004 Nakamura et al. ...... 360/125.12
6,952,325 B2 * 10/2005 Sato et al. ............. 360/125.08
6,969,989 B1 * 11/2005 Mei ........................... 360/31
7,215,502 B2 5/2007 Tagami .................... 360/77.08
7,221,530 B2 * 5/2007 Tomiyama et al. ........... 360/55
7,239,472 B2 * 7/2007 Sado et al. ................... 360/76
2002/0015253 A1 2/2002 Litvinov et al.
2003/0133217 A1 7/2003 Nunnelley
2003/0193742 A1 10/2003 Matono et al.
2004/0105186 A1 6/2004 Yano

FOREIGN PATENT DOCUMENTS

| JP | 2001-236605 | 8/2001 |
| JP | 2001-256605 | 9/2001 |
| JP | 2003-203309 | 7/2003 |
| KR | 1020020040442 | 5/2002 |

* cited by examiner

*Primary Examiner*—Hoa T. Nguyen
*Assistant Examiner*—James L Habermehl
(74) *Attorney, Agent, or Firm*—Volentine & Whitt, PLLC (57) ABSTRACT

An apparatus and method is provided for storing and retrieving information from a disk in which a TPI (tracks per inch) profile of a disk drive including a write pole having a trapezoidal cross-section is adaptively varied. The method includes comparing the slope angle of sides of a write pole associated with a magnetic head to a skew angle associated with a disk area; and dividing the disk areas into a first area in which the slope angle is greater than the skew angle and a second area in which the slope angle is not greater than the skew angle. Based on this comparison result, different track pitches for the first area and the second area are determined.

15 Claims, 7 Drawing Sheets

APPARATUS AND METHOD FOR ADAPTIVELY ADJUSTING RECORDING DENSITY OF A DISK UTILIZING A TRAPEZOIDAL SHAPED MAGNETIC HEAD

BACKGROUND OF THE INVENTION

1. Field of the Invention

The present invention relates to a method, apparatus, and recording medium for determining recording density of the recording medium, and more particularly, to a method, apparatus, and recording medium for adaptively varying a TPI (tracks per inch) profile of a disk drive.

This application claims the benefit of Korean Patent Application No. 10-2005-0117268, filed on Dec. 3, 2005, in the Korean Intellectual Property Office, the disclosure of which is incorporated herein in its entirety by reference.

2. Description of Related Art

U.S. Pat. No. 6,504,675, discloses a technique for designing a slope angle of a write pole to be greater than the maximum skew angle in order to prevent unwanted side writing of adjacent tracks due to a change in skew angle as the magnetic head travels across the disk.

A hard disk drive (HDD) includes a plurality of magnetic heads adjacently located to the surface of rotating disks. Each head reads information from the rotating disk by sensing a magnetic field formed on the surface of a disk or writes information on the disk by magnetizing the surface of the disk. Each head includes a write head for magnetizing a disk and a separate read head for sensing a magnetic field of the disk. The read head is typically composed of a magnetoresistive (MR) component which includes a resistor for varying a magnetic field of a disk and is referred to as an MR head. Each head is attached to a flexure arm carrying a subassembly called a head gimbal assembly (HGA). The HGAs are attached to an actuator arm which has a voice coil motor (VCM) for moving each head across the surface of each disk. Information is typically stored in annular tracks formed on the surface of each disk. In general, each track includes a plurality of segments or sectors where the VCM and actuator arm are configured to move each head to a track of a disk. The number of tracks of a disk depends on the width of a head in that a narrow head can accept more tracks and a wide head accepts fewer tracks. In general, recording density of a disk drive is defined as TPI (tracks per inch), which is density in the disk radius direction, and BPI (bits per inch), which is density in the disk rotation direction.

A drawback associated with the prior art is that since TPI of a disk drive cannot be adaptively changed, disk drive production manufacturing yields decrease. In addition, since TPI cannot be changed to an optimum state, disk capacity and quality may be compromised.

SUMMARY OF THE INVENTION

The present invention provides a method of adaptively adjusting recording density of a disk in order to determine an optimum TPI profile utilizing a disk drive having a write pole with a trapezoidal cross-section. The method comprises comparing a slope angle of sides of the write pole to a skew angle associated with a disk area where the disk areas are divided into a first area in which the slope angle is greater than the skew angle and a second area in which the slope angle is not greater than the skew angle. Based on this comparison result, different track pitches are determined for the first and second areas.

A disk drive apparatus is provided that includes a disk for storing information; a head having a write component for magnetizing the disk and a read component for sensing a magnetic field from the disk to read the stored information. The disk has a plurality of storage areas and a plurality of tracks for storing information. The write component includes a write pole having a trapezoidal cross-section. A memory stores a skew angle associated with each disk area as well as specification information of the write pole. A controller, communicating with the memory, reads the skew angle and the specification information from memory and compares the slope angle of sides of the write pole to the skew angle for each area. The disk areas are divided into at least a first area in which the slope angle is greater than the skew angle and a second area in which the slope angle is not greater than the skew angle and based on this comparison result, different track pitches are determined for the first and second disk areas.

BRIEF DESCRIPTION OF THE DRAWINGS

The above and other features and advantages of the present invention will become more apparent by describing in detail exemplary embodiments thereof with reference to the attached drawings in which.

DESCRIPTION OF EMBODIMENTS

The present invention will now be described more fully with reference to the accompanying drawings, in which exemplary embodiments of the invention are shown.

Figure 1:
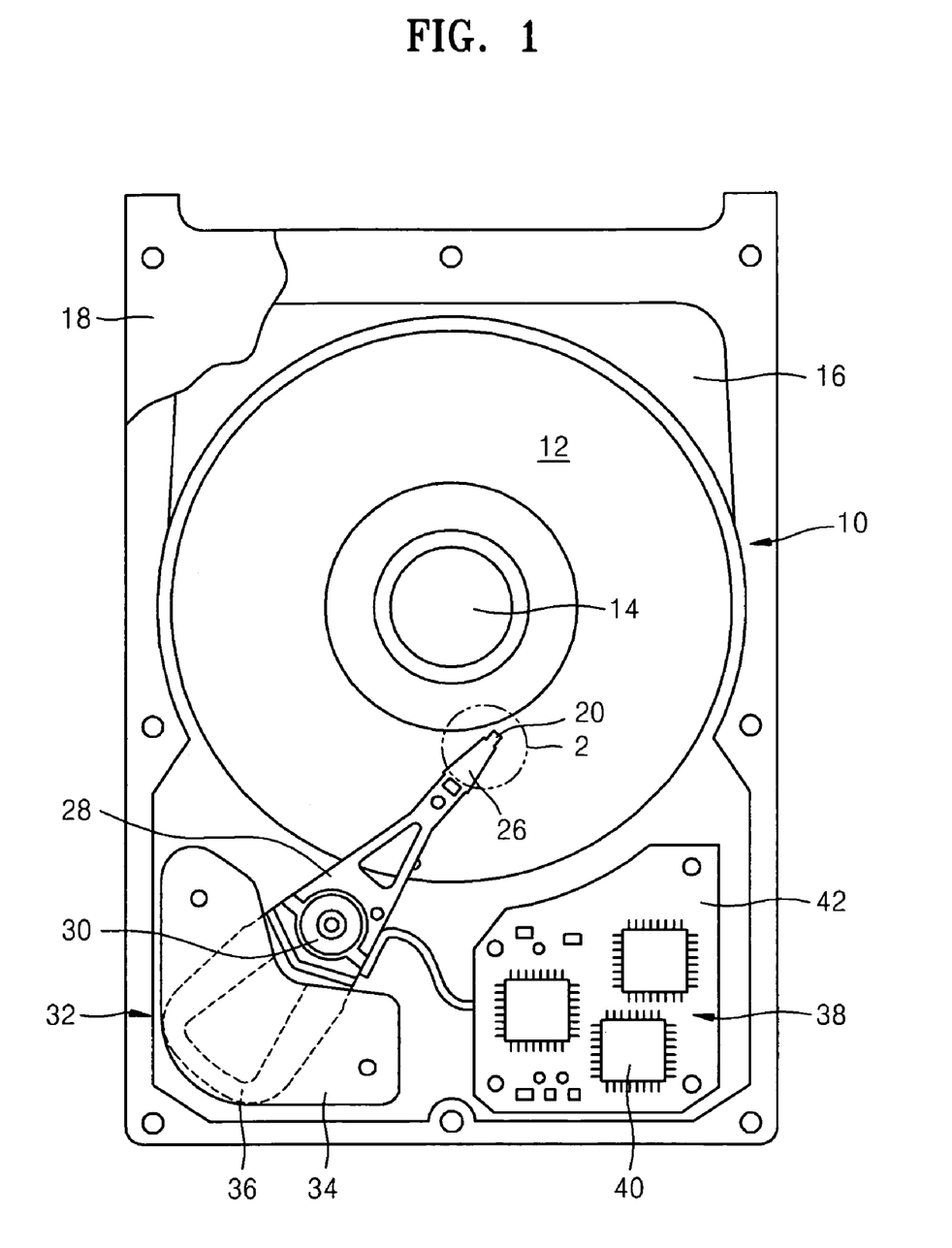
FIG. 1 is a plan view of a hard disk drive (HDD) according to an embodiment of the present invention.

FIG. 1 is a plan view of an HDD 10 that includes at least one magnetic disk 12 rotated by a spindle motor 14 mounted on board 16. A cover 18 is used to cover the at least one magnetic disk 12. HDD 10 also includes a plurality of heads 20 adjacently located to the surface of magnetic disk 12. Each head 20 is attached to a flexure arm 26, which is a component of an HGA. The flexure arm 26 is attached to an actuator arm 28 mounted on board 16 through a bearing assembly 30. A voice coil 32 is attached to the actuator arm 28. The voice coil 32 is combined with a magnetic assembly 34 to generate a current for a VCM 36. The current supplied to voice coil 32 generates a torque which rotates the actuator arm 28 and moves head 20 across the surface of disk 12. HDD 10 also includes a plurality of integrated circuits (ICs) 40 mounted to a printed circuit board (PCB) 42. The PCB 42 is connected to voice coil 32, heads 20, and spindle motor 14 via electrical lead lines (not shown).

Figure 2:
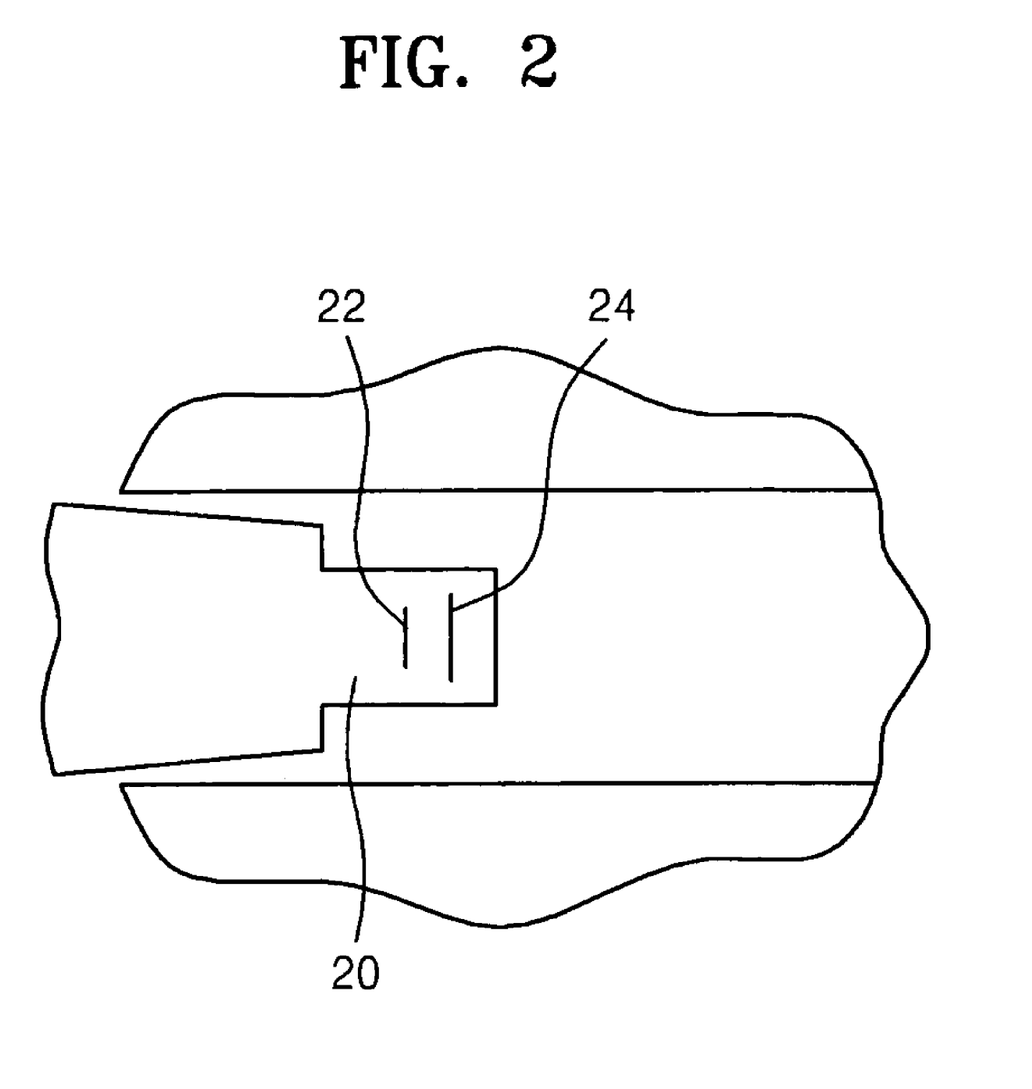
FIG. 2 is a magnified plan view of a head of the HDD of FIG. 1.

As illustrated in FIG. 2, each magnetic head 20 includes a write component 22 and a separated read component 24. The write component 22 magnetizes the disk 12 to write data onto a track of disk 12. The read component 24 senses a magnetic field of the disk 12 to read data from a track of disk 12. Read component 24 may be composed of an MR component having a resistor which varies linearly with respect to magnetic flux.

Figure 3:
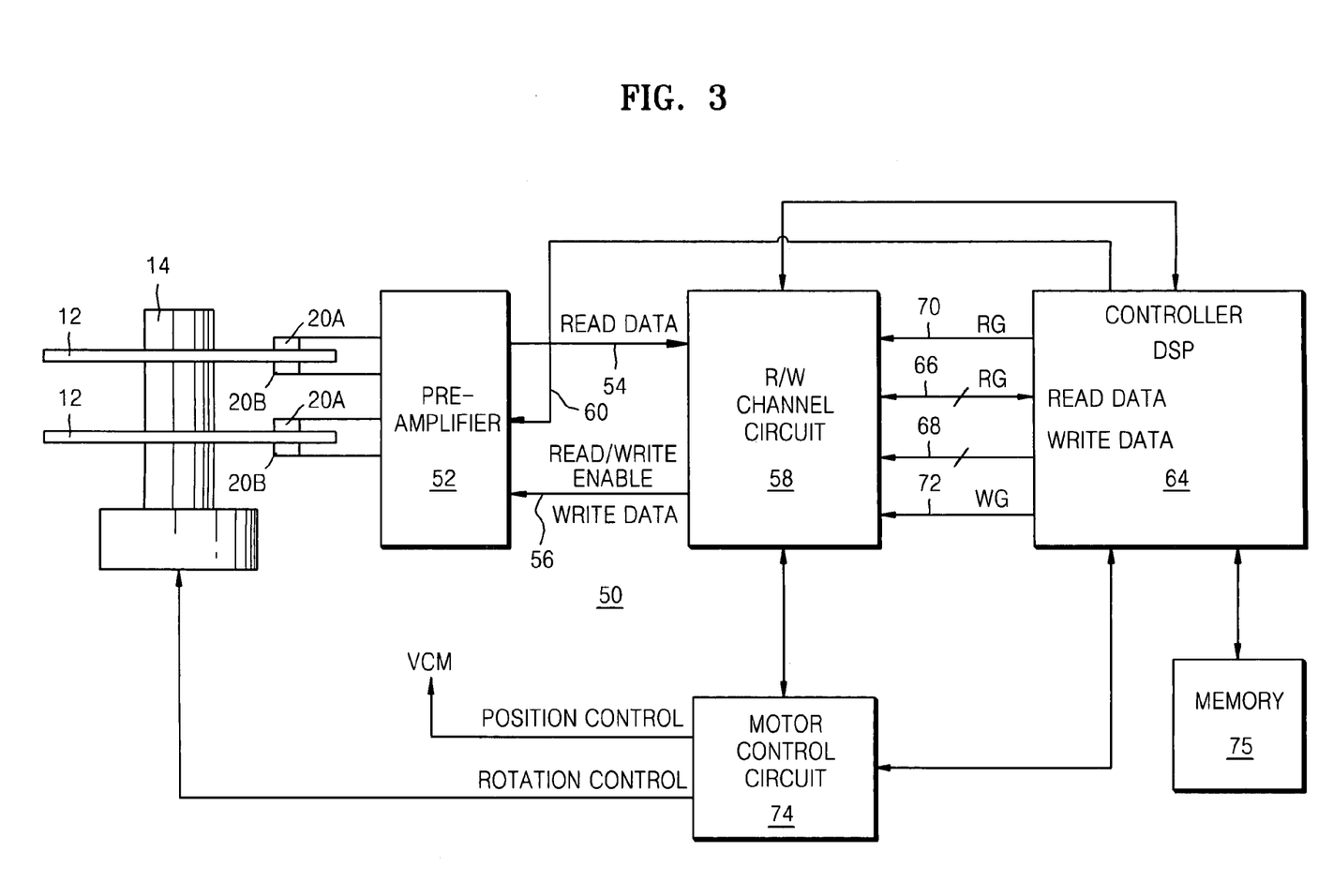
FIG. 3 is an electrical circuit configuration of the HDD of FIG. 1, according to an embodiment of the present invention.

FIG. 3 illustrates an electrical circuit 50 used to write or read data on or from disks 12 which includes a pre-amplifier 52 connected to heads 20. Each disk 12 is adjacent to a first head 20A and a second head 20B. Pre-amplifier 52 has a read data channel 54 and a write data channel 56, which are connected to a read/write (R/W) channel circuit 58. The pre-amplifier 52 also has an R/W enable gate 60 connected to controller 64. Data can be written or read on or from disk 12 by enabling the R/W enable gate 60. The R/W channel circuit 58 is connected to controller 64 via read and write channels 66 and 68 and read and write gates 70 and 72. The read gate 70 is enabled when data is read from disk 12. The write gate 72 is enabled when data is written on disk 12. Controller 64 may be a digital signal processor (DSP) operating according to software routines for reading or writing data from or on disk 12. The R/W channel circuit 58 and controller 64 are connected to a motor control circuit 74 controlling VCM 36 and spindle motor 14 of HDD 10. Controller 64 is also connected to a nonvolatile memory component 75 which may be, for example, a read only memory (ROM).

Figure 7:
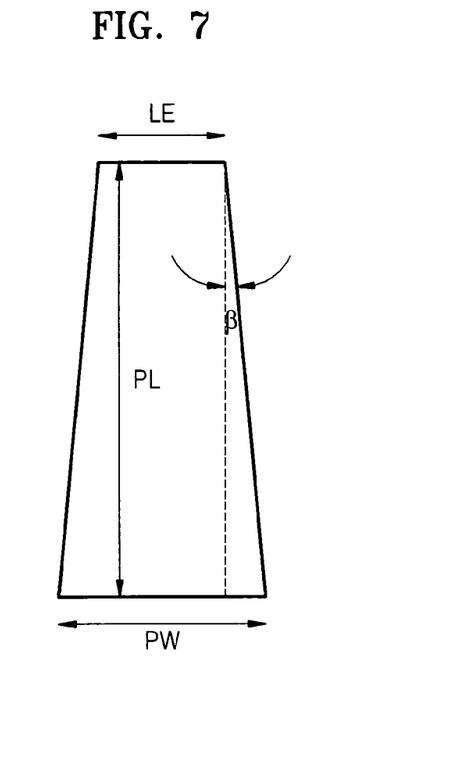
FIG. 7 is a cross-sectional view of a write pole according to an embodiment of the present invention.

The write component 22 corresponds to a write pole. Referring briefly to FIG. 7, the write pole is designed to have a trapezoidal cross-section where the width of a trailing edge PW is longer than the width of its leading edge LE. Memory component 75 stores the skew angle per area of disk 12 and specification information associated with a write pole which includes slope angle β of the write pole side, the length PL between the trailing edge and the leading edge of the write pole, and the width PW of the trailing edge of the write pole. These values PW, β, and PL can be determined through experimentation so that HDD 10 can have optimum recording performance. By utilizing this trapezoidal cross section of a write pole, the amount of ATW is reduced according to skew angle α, thereby increasing the recording density while writing data to a disk utilizing a perpendicular magnetic recording method.

Controller 64 processes this specification information and determines different track pitches for the areas of disk 12. In particular, controller 64 reads the skew angle α per area and the specification information of the write pole from memory component 75 and compares it to the slope angle β of the write pole side. Controller 64 divides the disk areas into a first area in which the slope angle β is greater than the skew angle α and a second area in which the slope angle β is not greater than the skew angle α, and determines different track pitches for the first area and the second area.

Figure 4:
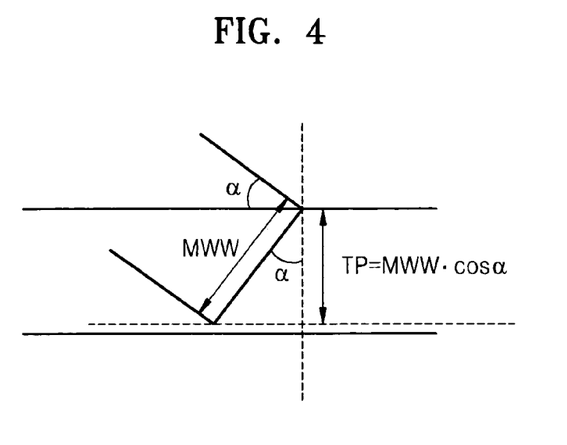
FIG. 4 illustrates a correlation between a write pole and a disk track for explaining a TPI determining method based on a skew angle, which is related to the present invention.

A technique of varying TPI per zone according to the skew angle α using a write pole having a rectangular cross-section will now be described. As illustrated in FIG. 4, the skew angle α is an angle between the edge line of the write pole and a perpendicular line of the track width, and the skew angle α varies according to a location on disk 12. Because the skew angle α varies according to a location on disk 12, a track pitch TP per zone can be obtained using Equation 1:

$$TP = MWW \cdot \cos \alpha \qquad (1)$$

Where MWW denotes the width of the write pole. An ideal TPI can be calculated using $1/(MWW \cdot \cos \alpha)$.

Figure 5:
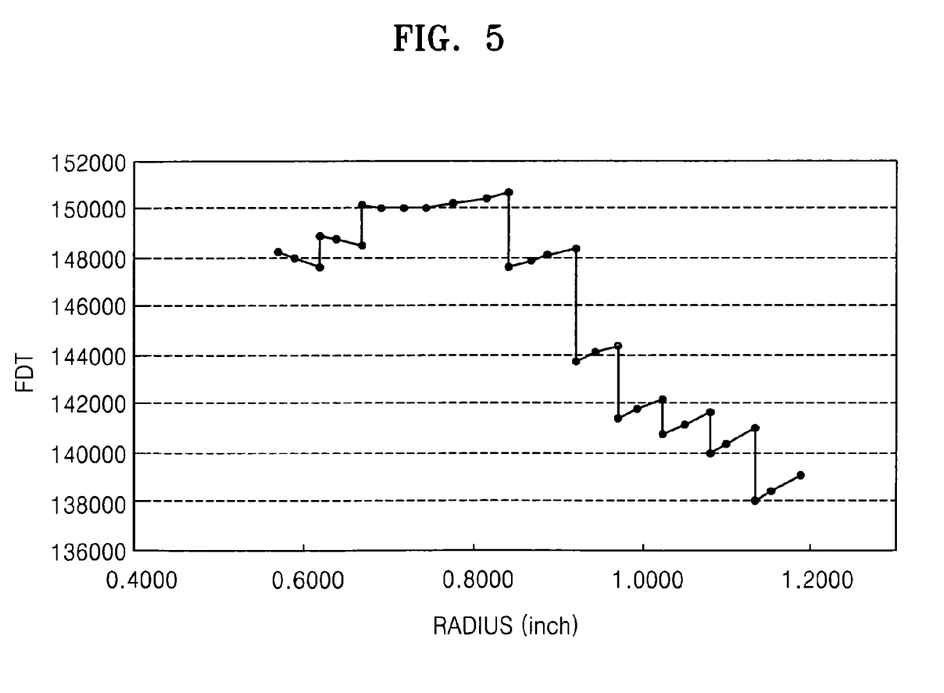
FIG. 5 illustrates a TPI profile using the TPI determining method based on a skew angle, which is related to the present invention.

A BER (bits per error rate) per zone is measured and if TPI decreases in a particular zone in which a decrease of BER performance occurs, the TPI profile illustrated in FIG. 5 can be obtained. If the track pitch (TP) is not compensated for, the amount of adjacent track writing (ATW) according to the skew angle α increases due to a structural influence of the write pole having a rectangular cross-section. If the track pitch TP is not compensated for, recording density decreases significantly.

Figure 6:
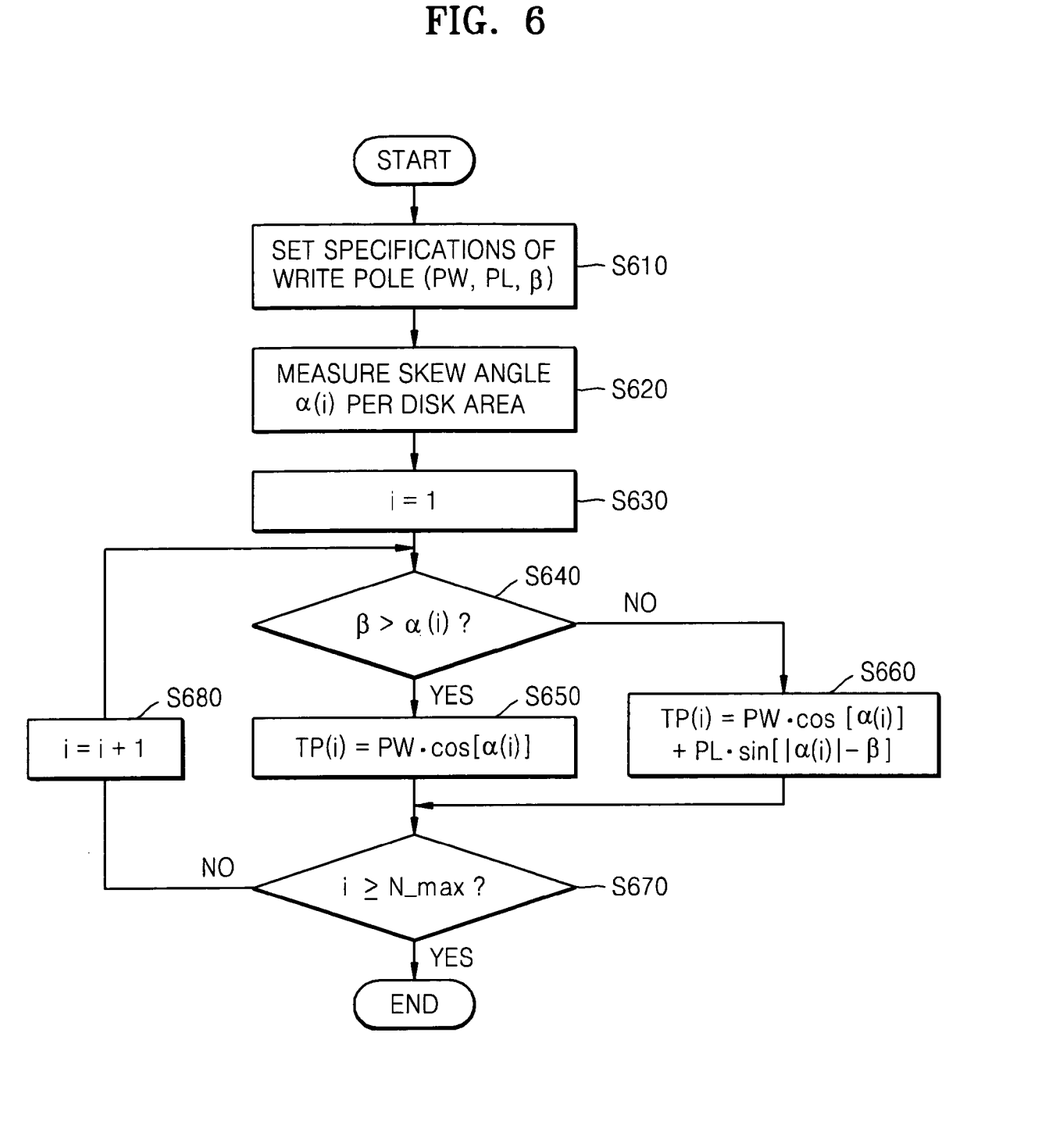
FIG. 6 is a flowchart illustrating a method of adaptively adjusting recording density of a disk according to an embodiment of the present invention.
Figure 8:
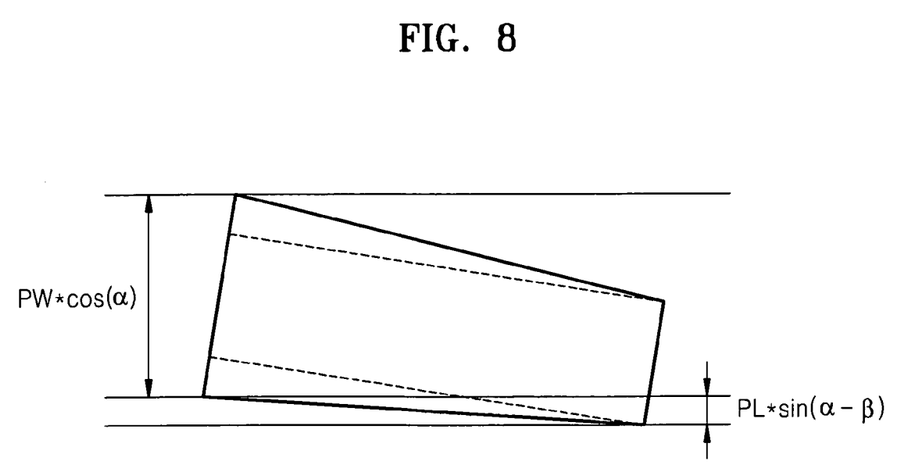
FIG. 8 illustrates a correlation between the write pole according to an embodiment of the present invention and a track at a location on a disk, which has a big skew angle.

An adaptive recording density adjustment method according to an embodiment of the present invention will now be described with reference to FIG. 6. At step S610, specifications of the write pole used for the HDD 10 are determined. That is the slope angle β of the side of the write pole, the length PL between the trailing edge and the leading edge of the write pole, and the width PW of the trailing edge of the write pole are determined in an initial design stage of the HDD 10. These values can be determined through experiments so that the HDD 10 can have the optimum recording performance. The determined specifications of the write pole are stored in memory component 75. The skew angle α(i) is measured for each disk area at step S620. For example, the skew angle α(i) can be measured for each disk area and, if necessary, the skew angle α(i) can be measured by dividing the disk area into more detailed areas. The skew angles are stored in memory component 75. A counter i (not shown) included in controller 64 is set to 1 at step S630. Values of the slope angle β of the side of the write pole and the skew angle α(i) are read from memory component 75, and the read value of the slope angle β of the side of the write pole is compared to the read value of the skew angle α(i) at step S640. In the case of i=1, α(1) of a first area of the disk 12 is compared to the slope angle β. If the slope angle β is greater than the skew angle α(i) from the result of step S640, a track pitch TP(i) in the first area of the disk 12 is determined using Equation 2 at step S650.

$$TP(i) = PW \cdot \cos \alpha(i) \qquad (2)$$

where, PW denotes the width of the trailing edge of the write pole. That is, in an area having a relatively small skew angle (α<β), an ideal TPI profile $1/(PW \cos \alpha(i))$ is used and the ATW effect is compensated for because of the trapezoidal cross-section pole structure. If the slope angle β is not greater than the skew angle α(i) as the comparison result from step S640, in step S660, the track pitch TP(i) in the area (i) of the disk 12 is determined using Equation 3.

$$TP(i) = PW \cdot \cos[\alpha(i)] + PL \cdot \sin[|\alpha(i)| - \beta] \qquad (3)$$

where PW denotes the width of the trailing edge of the write pole, and PL denotes the length between the trailing edge and the leading edge of the write pole. In an area having a relatively large skew angle (α>β), if only the ideal TPI profile is used, the ATW effect cannot be perfectly compensated for even if the trapezoidal cross-section pole structure is used. That is, as illustrated in FIG. 8, the value $PL \cdot \sin[|\alpha(i)| - \beta]$ cannot be compensated. Therefore, in the area having a relatively large skew angle (α>β), the value $PL \cdot \sin[|\alpha(i)| - \beta]$ is added to the track pitch values for generating the ideal TPI profile in the determination of the track pitch TP(i).

In step S670, the value of the counter i is compared to a value N_max indicating the last area of the disk 12 in order to determine whether the track pitch TP(i) up to the last area of the disk 12 is determined. If the value of the counter i is smaller than the value N_max based on the comparison result from step S670, the value of counter i is increased by 1 in step 680 and then steps S640 through S670 are repeated. If the value of counter i is greater than or equal to the value N_max based on the comparison result of step S670, this process ends since the track pitch TP(i) up to the last area of disk 12 has been determined. In this manner, the write pole having a trapezoidal cross-section is used, and the track pitch TP(i) is determined using Equation 2 or 3 according to the skew angle α(i) based on the slope angle β of the side of the write pole.

Figure 9:
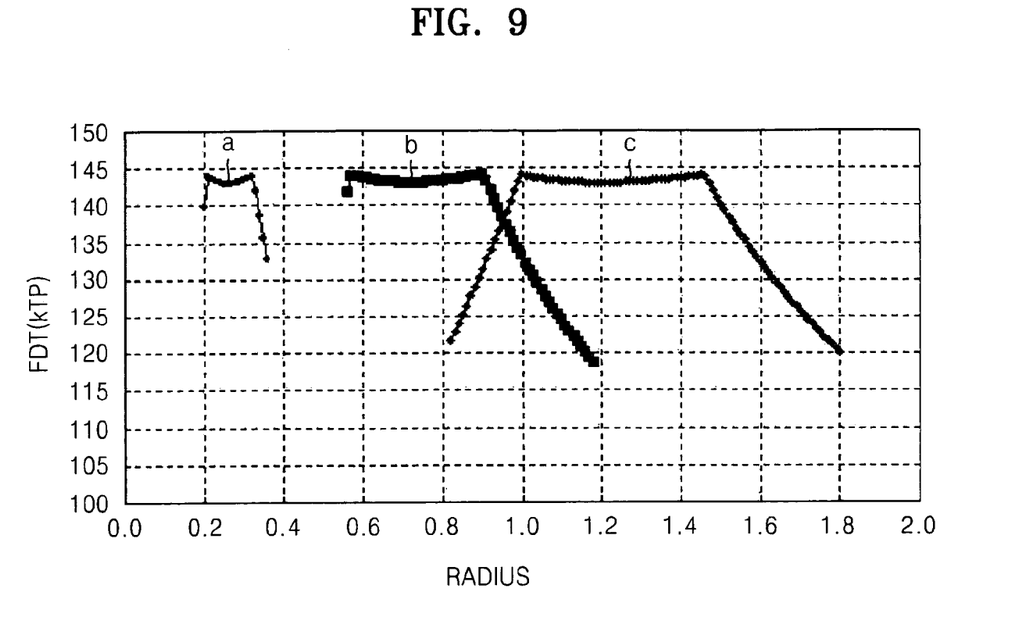
FIG. 9 illustrates TPI profiles in the HDD according to an embodiment of the present invention.

Exemplary TPI profiles obtained based on the determined track pitch TP(i) are illustrated in FIG. 9 where a denotes a TPI profile of a 0.85-inch disk, b denotes a TPI profile of a 2.5-inch disk, and c denotes a TPI profile of a 3.5-inch disk.

The invention described herein may be implemented as a method, an apparatus, or a system. In particular, when implemented using software, its component elements are code segments that execute necessary operations. Programs or code segments can be stored in processor readable media and can be transmitted via a computer data signal that is combined with a carrier wave in a transmission medium or in a communication network. The processor readable medium can be any medium that can store or transmit data. Examples of the processor readable medium include electronic circuits, semiconductor memory devices, ROMs, flash memories, erasable ROMs (EROMs), floppy disks, optical disks, hard disks, optical fibers, radio frequency (RF) networks, etc. The computer data signal can be any signal that is transmitted via transmission media, such as electronic network channels, optical fiber, air, RF networks, etc.

By using a write pole having a trapezoidal cross-section in a disk drive and adaptively determining a track pitch so that an ATW effect does not occur regardless of the value of a skew angle of a disk area based on a slope angle associated with sides of the write pole, production manufacturing yields of disk drives can be increased, and the storage capacity of a disk drive may be expanded within the limitation that the ATW effect does not occur.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of adaptively adjusting recording density of a disk in a disk drive, said disk drive having a plurality of disk areas and disk tracks, the method comprising:
   comparing a slope angle of sides of a write pole having a trapezoidal cross-section to a skew angle associated with each of said disk areas; and
   dividing the disk areas into a first and second areas wherein a skew angle of said first area is greater than said slope angle and a skew angle of said second area is not greater than said slope angle; and
   determining different track pitches of said disk tracks associated with said first and second areas utilizing said slope angle and skew angles.

2. The method of claim 1, wherein determining different track pitches further comprising determining said track pitches using only said skew angle of said first area and both said skew angle and said slope angle of said second area.

3. The method of claim 1, wherein one of said track pitches TP(i) associated with a particular disk location i in said first area is determined using $$TP(i)=PW\cdot\cos\alpha(i)$$

where PW denotes the width of a trailing edge of said write pole, and α(i) denotes said skew angle at said particular disk location i.

4. The method of claim 1, wherein one of said track pitches TP(i) associated with a particular disk location i in said second area is determined using $$TP(i)=PW\cdot\cos[\alpha(i)]+PL\cdot\sin[|\alpha(i)|-\beta]$$

where PW denotes the width of a trailing edge of said write pole, PL denotes the length between the trailing edge and a leading edge of said write pole, α(i) denotes a skew angle at said particular disk location i, and β denotes the slope angle of sides of said write pole.

5. The method of claim 1, wherein said method further comprises recording information on said disk drive utilizing a perpendicular magnetic recording method.

6. A disk drive comprising:
   a storage disk having a plurality of storage areas and a plurality of tracks for storing information;
   a head having a write component for magnetizing said disk and a read component for sensing a magnetic field from said disk, said write component including a write pole having a trapezoidal cross-section;
   a memory storing a skew angle associated with each of said areas of said disk and for storing specification information associated with said write pole; and
   a controller reading said skew angle and said specification information from said memory, said controller comparing a slope angle associated with sides of said write pole to one of said skew angles, said controller dividing said disk areas into a first area in which a slope angle is greater than the skew angle and a second area in which a slope angle is not greater than the skew angle such that track pitches associated with said tracks are determined for said first area and said second area.

7. The disk drive of claim 6, wherein said track pitches of said first area are determined using only said skew angle, and said track pitches of said second area are determined using both said skew angle and said slope angle associated with said second area.

8. The disk drive of claim 6, wherein a particular one of said track pitches TP(i) associated with a location in said first area is determined using the formula $$TP(i)=PW\cdot\cos\alpha(i)$$

where, PW denotes a width of a trailing edge of said write pole and α(i) denotes a skew angle at disk location i.

9. The disk drive of claim 6, wherein a particular one of said track pitches TP(i) associated with a location in said second area is determined using $$TP(i)=PW\cdot\cos[\alpha(i)]+PL\cdot\sin[|\alpha(i)|-\beta]$$

where, PW denotes a width of a trailing edge of said write pole, PL denotes a length between said trailing edge and a leading edge of said write pole, α(i) denotes a skew angle at a disk location i, and β denotes a slope angle associated with sides of said write pole.

10. The disk drive of claim 6, wherein information is stored on said disk by said write pole utilizing a perpendicular magnetic recording method.

11. A disk drive for storing information comprising:
   a recording medium having a plurality of disk areas, said disk areas divided into at least a first area and a second area; and a write pole configured to write information onto said disk areas, said write pole having a trapezoidal cross section, wherein said first area is characterized by a first track pitch determined using a first skew angle, wherein a slope angle is greater than said first skew angle, and wherein said second area is characterized by a second track pitch determined using a second skew angle, wherein said slope angle is not greater than said second skew angle.

12. The disk drive of claim 11, wherein said first track pitch is determined using only said first skew angle, and said second track pitch is determined using said second skew angle and said slope angle.

13. The disk drive of claim 11, wherein said first track pitch is associated with a particular disk location i in said first area and is determined using $$TP(i)=PW \cdot \cos \alpha(i)$$

where TP(i) denotes said first track pitch, PW denotes the width of a trailing edge of said write pole, and $\alpha(i)$ denotes said first skew angle, which is associated with said particular disk location i.

14. The disk drive of claim 11, wherein said second track pitch is associated with a particular disk location i in said second area and is determined using $$TP(i)=PW \cdot \cos [\alpha(i)]+PL \cdot \sin [\alpha(i)-\beta]$$

where TP(i) denotes said second track pitch, PW denotes the width of a trailing edge of said write pole, PL denotes the length between the trailing edge and a leading edge of said write pole, $\alpha(i)$ denotes said second skew angle, which is associated with said particular disk location i, and $\beta$ denotes said slope angle of sides of said write pole.

15. The disk drive of claim 11, wherein information is stored on said disk utilizing a perpendicular magnetic recording method.

* * * * *